(No Model.)  2 Sheets—Sheet 2.
J. GRADY.
CAR WHEEL AND AXLE.
No. 416,161.  Patented Dec. 3, 1889.
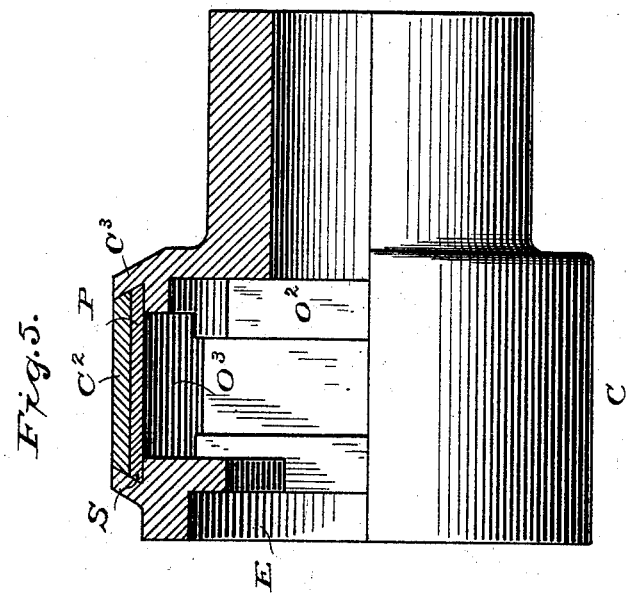
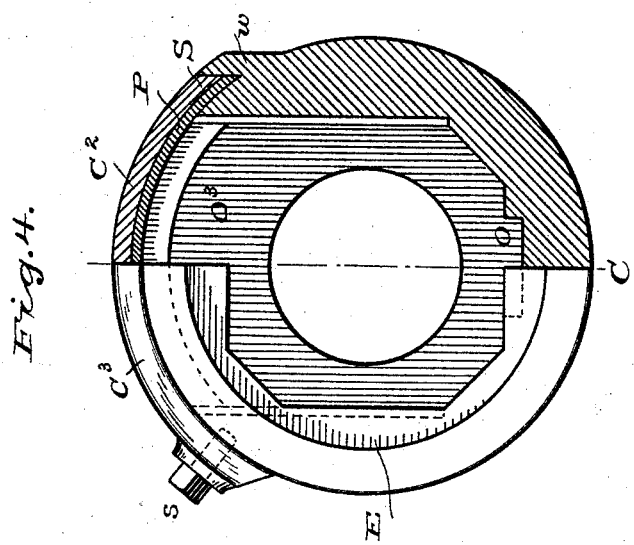
Witnesses  
H. H. Lamb  
Lort Phillips
Inventor  
JAMES GRADY.
Attorney.

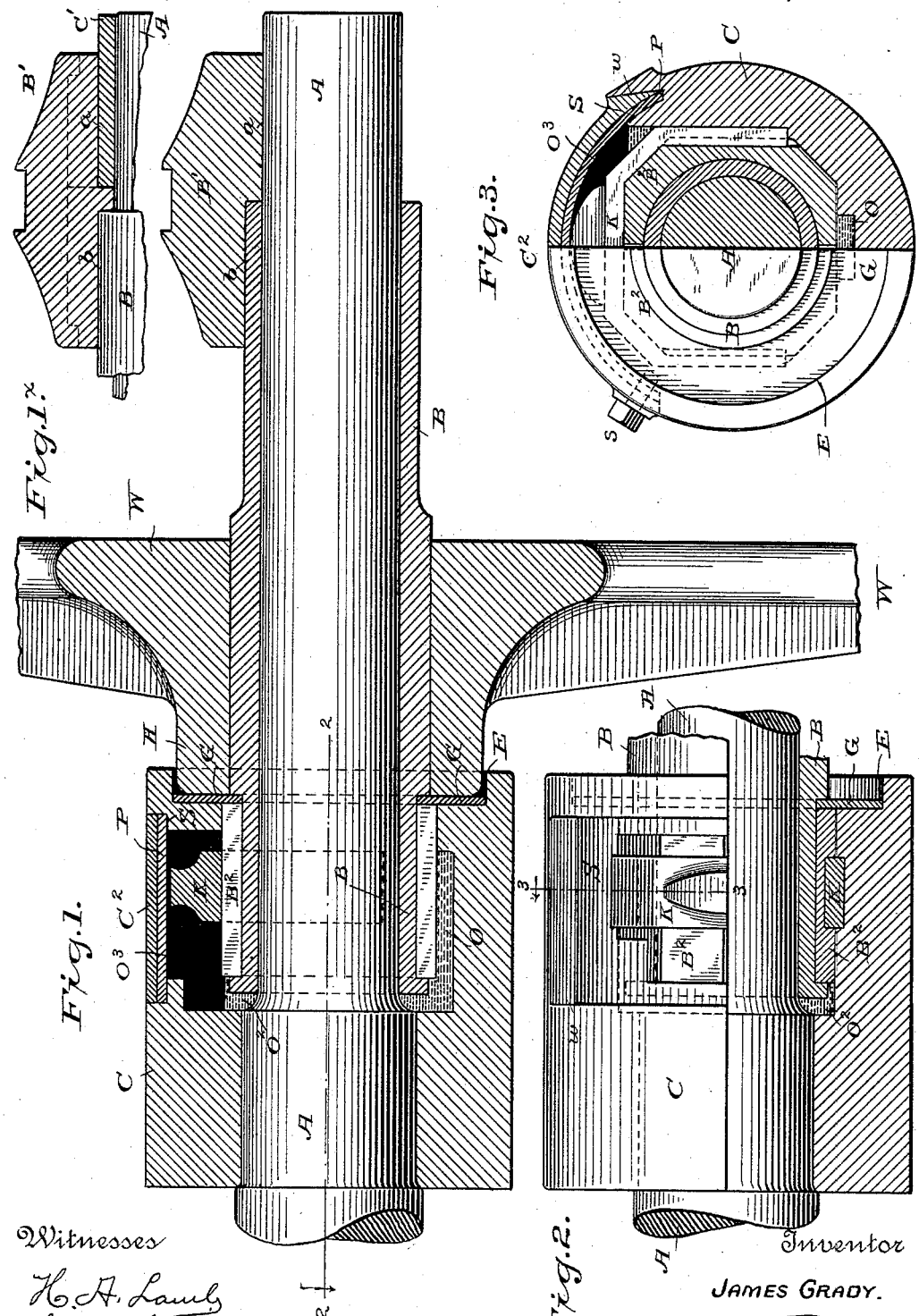

UNITED STATES PATENT OFFICE.

JAMES GRADY, OF BROOKLYN, NEW YORK.

CAR WHEEL AND AXLE.

SPECIFICATION forming part of Letters Patent No. 416,161, dated December 3, 1889.

Application filed April 6, 1889. Serial No. 306,225. (No model.)

*To all whom it may concern:*

Be it known that I, JAMES GRADY, a citizen of the United States, residing at Brooklyn, in the State of New York, have invented a new and useful Improvement in Car Wheels and Axles, of which the following is a specification.

This invention relates to means for providing street-cars and other railway-cars with "loose wheels" to lessen wear and strain in turning curves.

The present invention consists in certain novel combinations of parts hereinafter set forth and claimed, comprising a bushing which projects on both sides of the loose wheel, whereby I aim to accomplish the following objects, viz: first, to get a bearing outside of the wheel, partly on the wheel-bushing and partly on the axle-journal, so as to divide the load between them, to hold down the axle end by direct pressure, and to prevent unequal wear inside of the bushing; secondly, to obtain such double bearing at each loose wheel by a single brass common to the wheel-bushing and axle-journal; thirdly, to obtain such double bearing at each loose wheel by a single brass without complicating the removal and replacement of the wheel, as in making repairs; fourthly, to prevent lateral motion of the loose wheel by a collar-bearing at the inner end of the wheel-bushing, so as to keep the wheels from getting out of gage, and, fifthly, to render such collar-bearing oil and dust tight, and by the same means in part to form an anti-friction thrust-bearing at the inner end of the wheel-hub.

Two sheets of drawings accompany this specification as part thereof.

Figure 1 of the drawings represents an axial longitudinal section through the hub of a loose car-wheel and an elevation of a plain axle-journal within the same, with sectional views of parts combined therewith according to my invention. Fig. 1$^\times$ is a fragmentary section corresponding as to plane with Fig. 1, illustrating certain modifications. Fig. 2 represents a top view of the bearing at the inner end of the hub, as shown in Fig. 1, with its oil-tight cap removed and the lower half in section on the line 2 2. Fig. 3 represents an end view of the parts as seen in Fig. 1 with the outer brass and wheel omitted and the axle-journal, wheel-bushing, and inner bearing partly in section on the line 3 3, Fig. 2; and Figs. 4 and 5, Sheet 2, are respectively an end view, half in section, and a side view, half in section, illustrating preferred modifications of the recessed axle-collar and its oil and dust tight closure.

Like letters of reference indicate corresponding parts in the several figures.

In carrying my invention into effect I take a car-wheel W, of any approved pattern, having a suitably-machined bore and hub, and an axle A, having a suitable journal end, and I provide the wheel-bore with a rigid bushing B, of suitable metal, fast therein, fitted internally to the axle-journal, so as to turn smoothly thereon, and projecting on both sides of the wheel, as represented in Fig. 1. The outer end of the bushing B is adapted to project into an axle-box, which may be of any approved style apart from its brass or brasses B'. The axle-journal projects beyond the extremity of the bushing, and two bore-surfaces *a b* of said brass or brasses B' are fitted, respectively, to the axle-journal itself, as in Fig. 1, or to a ferrule or collar C', fast on its protruding end, as in Fig. 1$^\times$, and to the outside of the bushing B, so as to divide the weight between the two, hold down the axle end, and prevent undue wear, as aforesaid.

At the inner end of the axle-journal a recessed collar C is made fast on the axle A. The end of this collar opposed to the wheel admits the inner end of the bushing B, and also, preferably, that of the wheel-hub H, as shown in Fig. 1, together with a pair of brasses B$^2$, Figs. 1, 2, and 3, which embrace a "button-journal" formed on the bushing. The recess of the collar C is primarily fitted to these brasses, which are adapted to slide snugly into the same and to turn with the collar. The backs of the brasses B$^2$, respectively, and the opposing walls of the collar-recess are grooved to receive the ends of a bifurcated check-key K, which locks the brasses B$^2$, and thereby the bushing B, with its button-journal, against endwise displacement, and thus prevents any lateral displacement of the wheel or loss of gage.

In line with the check-key K there is a peripheral opening in the collar C, through which the same is readily inserted and removed, and which also provides for introducing oil or grease. For the accommodation of the latter suitable spaces O O² O³ are left within the collar diametrically opposite said opening and at the end of the bushing, as well as immediately within said opening, so that the back bearing formed by the collar C and brasses B² in coaction with said button-journal of the bushing B shall be well lubricated. The interior of the bushing is also lubricated through its outer end from the axle-box. A packing-seat S surrounds said peripheral opening of the collar C, and upon the same a sheet P of suitable packing is clamped by a cover C², which is held down at its respective ends by a wedging-socket $w$, Figs. 2, 3, and 4, and a tap-screw $s$, Figs. 3 and 4, so as to effect a dust and oil tight closure of said opening.

For the reception of the end of the wheel-hub H the collar C is provided with a counterbore or end recess E, which is provided with a dust and oil tight gasket G, Figs. 1, 2, and 3, of suitable fiber, adapted to serve also as an anti-friction washer.

In assembling the parts as above described the bushing B is pressed into the bore of the wheel W, and the collar C is pressed into place on the axle A. The gasket G and brasses B² are then applied to the bushing and the axle-journal is inserted through the bushing, the button-journal and brasses passing endwise into the collar C. The check-key K is then inserted, together with a supply of lubricant. The packing P is applied to the seat S, and the cover C² is fastened down by means of the tap-screw $s$. The axle-box is simply provided with the said brass or brasses B' in place of its ordinary brasses, the compound journal being inserted like an ordinary axle-journal.

Instead of the forms represented, said outer journal may, for example, be a "plain" or a "button" journal, if preferred, and either form of the brass B' may be divided, so that its respective bore-surfaces $a$ and $b$ shall be formed in independently-renewable brass-sections or brasses, as illustrated by dotted lines in Fig. 1ˣ.

With that form of brass B' represented in Fig. 1 the axle-journal may be withdrawn from the bushing B after simply removing the check-key K. With the modified brass represented in Fig. 1ˣ the ferrule or collar C' must first be removed from the axle, and must be pressed on or otherwise fastened in place after assembling the other united parts, as above set forth.

In the preferred modification of the axle-collar C and its closure (illustrated by Figs. 4 and 5) the collar is made of two diameters, so as to obtain a larger recess and a longer bearing on the axle, and at the same time less weight. The packing-seat S is peripheral, and the cover C² is more tightly held down on the packing by a peripheral curb C³, the inner walls of which are machined to form a dovetail socket open at one end, into which the cover slides. Its other end is provided with the said wedging-socket $w$, and the outer end of the cover is provided with a socket for the tap-screw $s$, as shown in Fig. 4.

Other like modifications will suggest themselves to those skilled in the art, and details which have not been specified may be of any approved description.

I claim as my invention and desire to patent under this specification—

1. A loose car-wheel provided with a rigid bushing which projects on both sides thereof, in combination with an axle the journal of which projects through the bushing and a brass or brasses having bearings partly on the axle-journal and partly on the outside of the wheel-bushing, substantially as hereinbefore specified.

2. In combination with a loose car-wheel provided with a rigid bushing which projects on both sides thereof and an axle the journal of which projects through said bushing, a single brass having bore-surfaces opposed, respectively, to the axle-journal and the bushing, substantially as hereinbefore specified.

3. A stepped brass having bore-surfaces at different heights, in combination with a loose car-wheel provided with a rigid bushing and an axle the journal of which projects through said bushing, substantially as hereinbefore specified.

4. The combination of a loose car-wheel having a rigid bushing which is provided with a button-journal at its inner or back end, a pair of brasses embracing the latter, an axle having a journal end fitted to said bushing and provided with a recessed collar fast thereon, and a check-key fitted to transverse key-seats in said brasses and collar, substantially as hereinbefore specified.

5. In combination with a loose car-wheel having a rigid bushing which is provided with a button-journal at its inner or back end, a pair of brasses embracing the latter, an axle having a journal end fitted to said bushing, a recessed collar fast on the axle, having an end recess which admits the inner or back end of the wheel-hub and a peripheral opening, a check-key fitted to transverse key-seats in said brasses and collar, a gasket within said end recess, and an oil and dust tight cover for said peripheral opening, with suitable packing and fastenings, substantially as hereinbefore specified.

6. In combination with a loose car-wheel having a back bearing at the inner or back end of its hub, a recessed collar forming the shell of such bearing and having a peripheral opening, a peripheral packing-seat around said opening, and a peripheral curb surrounding said seat on three sides and forming a dovetail socket, a packing and a sliding cover fitted to said seat and said socket, and a screw which fastens the cover in place, substantially as hereinbefore specified.

JAMES GRADY.

Witnesses:
RALPH C. SWAN,
J. W. FOWLER.